United States Patent [19]

Hastings et al.

[11] 3,787,844
[45] Jan. 22, 1974

[54] RADIO NAVIGATION SYSTEM

[75] Inventors: Charles E. Hastings, Newport News; William A. Rounion, Tabb; Allen L. Comstock, Newport News; Joseph T. Bradbury, Virginia Beach, all of Va.

[73] Assignee: Teledyne, Inc., Los Angeles, Calif.

[22] Filed: May 8, 1972

[21] Appl. No.: 251,470

[52] U.S. Cl................. 343/6 R, 343/12 R, 343/15, 343/105 R, 343/112 R
[51] Int. Cl............................................... G01s 9/02
[58] Field of Search..... 343/112 R, 12 R, 105 R, 15

[56] References Cited
UNITED STATES PATENTS

| | | | |
|---|---|---|---|
| 2,724,114 | 11/1955 | Kaufman | 343/105 R |
| 3,242,494 | 3/1966 | Gicca | 343/112 R |
| 3,400,399 | 9/1968 | Kline | 343/112 R |

*Primary Examiner*—Maynard R. Wilbur
*Assistant Examiner*—Richard E. Berger
*Attorney, Agent, or Firm*—Ronald W. Reagin and Ralph M. Braunstein

[57] ABSTRACT

An improved iso-phase line-of-position navigation system for determining the position of a mobile station is disclosed which includes first and second transmitting base stations at respectively fixed locations and a third transmitting station positioned at a movable location. A mobile station is disclosed which includes a receiver for receiving signals from the two base stations and from the third station and means responsive to the signals received at the receiver for determining the position of the mobile station along first and second iso-phase lines-of-position relative to the first and second base stations and the third station. Computing means are provided which are responsive to the position of the mobile station relative to the first and second base stations and the third station and also to the absolute location of the third station for computing the position of the mobile station.

7 Claims, 4 Drawing Figures

RADIO NAVIGATION SYSTEM

This invention relates to radio navigation systems, and more particularly to an improved non-saturating iso-phase line-of-position navigation system which can be used in conjunction with existing navigation systems such as range-range iso-phase line-of-position navigation systems.

There are several types of iso-phase line-of-position navigation systems which are presently in widespread use to determine the precise position of a ship or other vessel which is navigating in the general vicinity (within 200 to 300 miles) of a shoreline. Two such systems known to those skilled in the art are the circular line-of-position system, also known as the range-range system, and the hyperbolic line-of position system. In each of these systems, transmitters or base stations are provided along the shoreline at known fixed locations and signals broadcast by these base stations are received by a vessel. The vessel contains suitable means for determining the phases of the signals received from the base stations and from the phases of these signals determines the position of the vessel along an iso-phase line-of-position relative to each of the base stations. The intersection of two such lines-of-position provide a "fix" or definite location of the vessel at that time.

However, there are certain drawbacks associated with each of these types of iso-phase navigation systems. In the case of the circular or range-range system, the vessel itself must also transmit a signal to the base stations. Thus, because of frequency allocations and because of the difficulty in separating signals of very close frequency which might be broadcast from different vessels in the same vicinity, there are definite limits on the number of vessels or ships which can operate in the same area using the same base stations. At the present time, the practical limit of the number of vessels which can use the same base stations at the same time is only three or four vessels. Thus, such a system is termed a saturating system, because of the limitation in the number of vessels which can use the system at the same time. Another problem with the circular or range-range system is that the accuracy of the system diminishes substantially as a vessel approaches the shoreline between the two base stations. This degraduation in performance in this area is caused by the sharp angles of intersection of the iso-phase lines-of-position along the straight or base line between the two base stations. Thus, while the range-range system is noted for its extreme accuracy of position, at least when the vessel using the system is a sufficient distance away from the shoreline, it is also known that such systems suffer from the two defects described above.

The hyperbolic line-of-position system overcomes some of the defects of the range-range system described abive, but suffers from separate defects of its own. The hyperbolic system requires at least three transmitters which are not located in a straight line with each other. Thus, if the shoreline along which the base stations are to be located is a generally straight shoreline, the center station must be positioned some distance inland from the shoreline. This leads to serious performance problems, since it is known that the range of a signal being transmitted at a given power level is much greater over water than it is over land. Experience has shown that in many instances, over poor terrain, a signal of a given strength will travel only about 10 miles over land, whereas the same signal could travel 200 to 300 miles over water. Thus, if the central station must be located up to 10 miles inland from the shoreline in an area of poor terrain, such as over jungle, mountains or the like, vessels operating offshore frequently receive no signals whatsoever from this station, and the entire system is rendered inoperative.

It is also known to those skilled in the art that the effective area which can be covered by a hyperbolic line-of-position system is considerably less than the area which can be covered by a range-range system, since the area over which the angles of intersection of the hyperbolic lines-of-position are close to rectilinear intersections, which is necessary for high accuracy, is considerably less than the area over which the circular lines of position so intersect.

However, the hyperbolic line-of-position system is a completely non-saturating system, in that the vessel navigating in the system need carry only a receiver, and does not itself broadcast any signals to the base stations. Thus, an unlimited number of vessels may use the system simultaneously on the same frequency bands.

One approach which has been used with some degree of success in the prior art is to provide a hyperbolic line-of position system in which two base stations are positioned along the shore-line, in a manner similar to conventional hyperbolic systems and to range-range systems, and the third base station is positioned somewhere offshore, such as on an island, if one is conveniently located, or on some other fixed platform such as an offshore oil well drilling platform. It has been found that very good accuracy can be obtained by using a hyperbolic system on a vessel which is operating generally within the triangle bounded by the two base stations and the offshore station, since in this area the angles of intersection of the lines-of-position are extremely good. However, the use of this type of system has obviously been limited to those few areas which include a suitable offshore location for locating the third base station.

It is accordingly an object of the present invention to provide an improved iso-phase line-of-position radio navigation system.

It is yet another object of the present invention to provide an improved iso-phase line-of-position radio navigation system which requires only two base stations positioned along the shoreline, and thus requires no base station position some distance inland from the shoreline.

It is yet another object of the present invention to provide an improved such radio navigation system which is non-saturating, that is which can be used simultaneously by a large number of mobile stations to determine their respective positions.

Briefly stated, and in accordance with the presently preferred embodiment of the invention, an improved iso-phase line-of-position navigation system for determining the position of a mobile station is provided which includes first and second base stations at respectively fixed locations located along the shore-line and a third station positioned at a movable location at sea which includes a transmitter for broadcasting signals at a predetermined frequency. Conveniently, the first and second base stations and the third station can themselves be the conventional components of a range-range navigation system of the type described above in which the third station is carried on a vessel and the range-range system is used in the conventional manner to determine the position of that vessel relative to the two base stations. In accordance with the present invention, a mobile station whose position is to be determined is provided which includes a receiver for receiving signals from the two base stations and from the third station and means responsive to the signals received at the receiver for determining the position of the mobile station along first and second iso-phase lines-of position relative to the first base station and the third station and the second base station and the third station respectively. Conveniently, the mobile station can be carried by a launch which is operating in conjunction with the above mentioned vessel carrying the third station. Computing means are provided which are responsive to the position of the mobile station relative to the first and second base stations and the third station and also to the absolute location of the third station for computing the position of the mobile station independently of the position of the third station.

For a complete understanding of the invention, and an appreciation of its other objects and advantages, please refer to the following detailed description of the attached drawings, in which.

Figure 1:
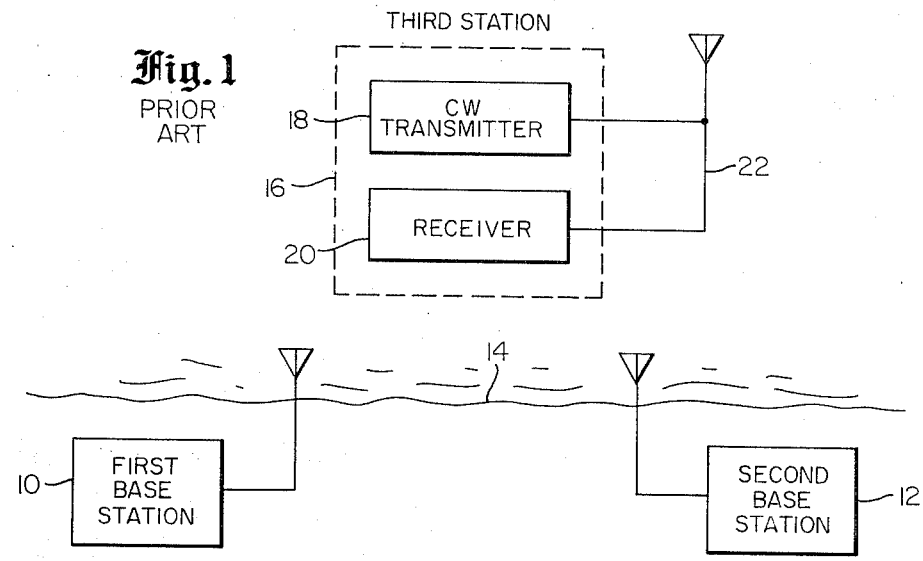
FIG. 1 is a block diagram of a range-range iso-phase line-of-position navigation system such as is known in the prior art.

FIG. 1 shows a block diagram of a typical range-range iso-phase line-of-position navigation system such as is well known to those skilled in the art. This prior art system is shown and described here to provide a proper antecedent for the description of the system of the present invention below and to show the manner in which the present invention utilizes presently available equipment to overcome the defects in the prior art system noted above.

Briefly, the range-range system of FIG. 1 includes a first base station 10 and a second base station 12 which are typically positioned along a shoreline 14. The system also includes a third station 16 whose position is to be determined. Typically, the third station 16 is carried aboard a vessel or the like which is navigating on the sea in the general vicinity of the base stations 10 and 12. Range-range systems presently available are operational for distances up to 2 to 300 miles from the base stations 10 and 12, so the vessel carrying the third station 16 can be navigating anywhere within this region.

The third station 16 includes a continuous wave (CW) transmitter 18 and a receiver 20 which can share a common antenna 22. Briefly, the system operates as follows: The CW transmitter 18 broadcasts a continuous signal of a fixed frequency $F_m$. This signal is broadcast through the antenna 22 and is received at the two base stations 10 and 12, each of which includes a receiver for receiving the signals broadcast by the third station 16 and a transmitter for broadcasting a signal comprising a carrier signal and a modulation signal. The carrier signal has a frequency relation to the signal $F_m$ such that a multiple of the carrier signal differs from the frequency $F_m$ by an amount $\Delta f$ which is itself usually a frequency in the audio range. The value of $\Delta f$ for each of the base stations 10 and 12 is sufficiently different that signals of these frequencies can easily be segregated for separate handling in the receiver 20.

Thus, using the terminology and designation just given, the frequency of the carrier wave being broadcast by the first base station 10 can be designated $(F_m - \Delta f_1)/2$ and the frequency of the carrier wave being broadcast by the second base station 12 can be designated $(F_m + \Delta f_2)/2$.

The transmitter in the first base station 10 includes a local oscillator which is free running at the frequency $(F_m - \Delta f_1)/2$. No attempt is made to regulate the phase of this oscillator relative to the phase of the signal being broadcast by the CW transmitter 18 of the third station 16. Instead, the local oscillator signal at the first base station 10 is doubled in a frequency multiplier at base station 10 and heterodyned with the signal $F_m$ received at base station 10 to develop a first modulation signal whose frequency is $\Delta f_1$. This first modulation signal is modulated onto the carrier wave at first base station 10. Any desired form of modulation, such as amplitude modulation or frequency modulation may be used, but in the preferred system available today, the modulation signal is modulated as a single sideband onto the carrier signal. This signal sideband modulation may be either an upper sideband or a lower sideband modulation, but to provide optimum frequency separation, it is preferred that whichever of the two base stations 10 and 12 is operating at the lower frequency use a lower single sideband modulation and the other base station use an upper single sideband modulation.

The modulated signal as broadcast by first base station 10 is now received by the receiver 20 in the third station 16. The receiver 20 separates the modulation signal from the carrier wave and also places the carrier wave in a frequency multiplier to double its frequency. The doubled carrier wave is then heterodyned with the signal from the CW transmitter 18 to develop an additional signal which has the frequency $\Delta f_1$. This signal and the modulation signal as demodulated by the receiver 20 are then placed in a phase meter to determine the difference in the phases of these two signals of frequency $\Delta f_1$. As is well known to those skilled in the art, this difference in phase is the indication of the range between the third station 16 and the first base station 10, and places the third station 16 in a circular iso-phase line-of-position around the first base station 10.

In a similar manner, the second base station 12 receives the signal of frequency $F_m$ from the third station 16 and transmits a modulated signal having a carrier frequency $(F_m + \Delta f_2)/2$ and having a second modulation frequency of signal $\Delta f_2$ modulated thereon, which signal is received by the receiver 20. The receiver 20 demodulates this signal to recover the second modulation signal and also doubles this carrier signal and heterodynes it against the signal from the CW transmitter 18 to develop a second signal also having the frequency $\Delta f_2$. Again, the difference in the phases of these two signals is an indication of the range between the third station 16 and the second base station 12, and places the third station 16 along a circular iso-phase line-of-position around the second base station 12. The intersection of these two circular lines-of-position so determined establishes a definite location or fix of the position of the third station 16.

In a typical range-range navigation system of the type just described, the frequency $F_m$ of the CW transmitter 18 might be 3300.400 kHz, the frequency $\Delta f_1$ might be 370 Hz and the frequency $\Delta f_2$ might be 450 Hz. Thus, the carrier frequency of the first base station 10 would be 1650.015 kHz and the carrier frequency of the second base station 12 would be 1650.425 kHz.

No internal details of the base stations 10 and 12 or the receiver 20 are shown in the description given above, since such components per se are well known to those skilled in the art, and in themselves form no part of the present invention. For example, details of such base stations are shown in the co-pending U.S. Pat. application Ser. No. 96,767, filed Dec. 10, 1970 and assigned to the assignee of the present application.

Figure 2:
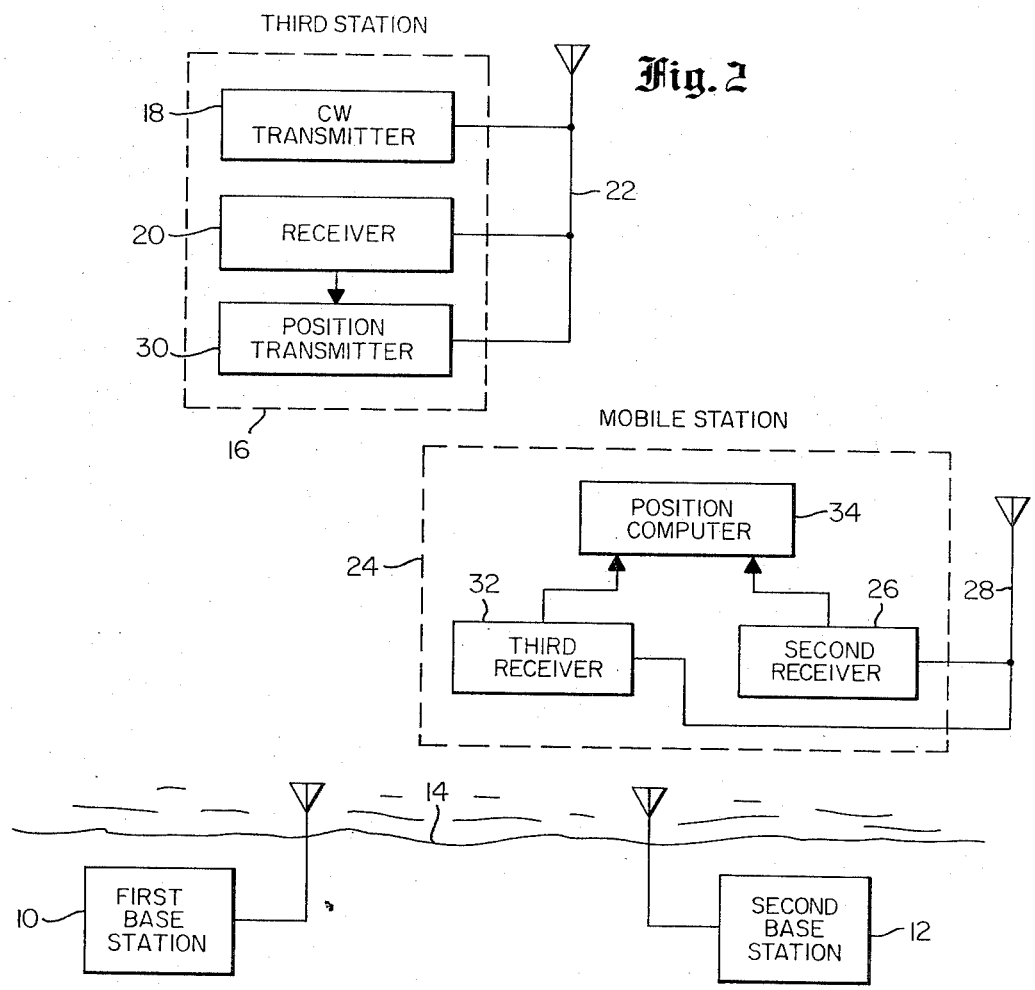
FIG. 2 is a block diagram of an iso-phase line-of-position navigation system in accordance with the presently preferred embodiment of this invention.

FIG. 2 shows a block diagram of an iso-phase line-of-position navigation system in accordance with the present invention for determining the position of a mobile station 24 which might be navigating in the general area bounded by the first and second base stations 10 and 12 respectively, and the third station 16 of the range-range system of FIG. 1 described above. For example, the mobile station 24 might be carried on a launch or the like which is operating in conjunction with the vessel carrying the third station 16. Thus, the vessel might be termed the mother vessel of the launch carrying the mobile station 24.

The mobile station 24 includes a second receiver 26 which receives its input signals through an antenna 28. The second receiver 26 can be generally similar to the receiver 20 in the third station 16. In the manner well known to those skilled in the art, the second receiver 26 receives the signals being broadcast by first and second base stations 10 and 12 respectively and third station 16 and determines the position of mobile station 24 along two sets of iso-phase lines-of-position relative to these three stations. Thus, the intersection of these two lines-of-position determines the position of the mobile station 24 relative to these three stations. For example, second receiver 26 can receive the signal $F_m$ being broadcast by the third station 16 and the two carrier signals and modulation signals being broadcast by the base stations 10 and 12. In the manner described in the above mentioned co-pending application Ser. No. 96,767, filed Dec. 10, 1970, this is sufficient information for second receiver 26 to determine the position of mobile station 24 relative to these three stations, either along hyperbolic iso-phase lines-of-position having the base line first base station 10-third station 16 and second base station 12-third station 16 or along halops iso-phase lines-of-position. Since the manner in which second receiver 26 operates is not part of the present invention, and since its manner of operation is well known to those skilled in the art, no further description of the structure or operation of this receiver is given herein.

However, it will be appreciated that, while second receiver 26 gives the position of mobile station 24 relative to first and second base stations 10 and 12 and third station 16, this does not determine the absolute position of mobile station 24, since the third station 16 is being carried on another vessel which itself might be moving about the same time as is the launch carrying the mobile station 24. In accordance with the present invention, this is compensated for by providing a position transmitter 30 on third station 16 which receives its input signal from the receiver 20 which indicates the position of the third station 16 at the particular instant. This position indicating signal is then transmitted by position transmitter 30, conveniently through antenna 22, and is received at the mobile station 24 on antenna 28 and applied to a third receiver 32, which can be a conventional receiver which is compatible with the format of the signal being broadcast by position transmitter 30. Thus, the output of the third receiver 32 indicates the instantaneous position of the third station 16. The output of this receiver and the second receiver 26 are applied to a position computer 34 which computes the instantaneous absolute position of mobile station 24 independent of the position of the third station 16. This is a relatively simple computing task, since the locations of first and second base stations 10 and 12 are known and fixed, and the position of third station 16 is known through the third receiver 32. Since all three of these positions are now known to position computer 34, and since the second receiver 26 gives the position of mobile station 24 relative to these three stations, the position computer 34 can easily compute the absolute position of mobile station 24 at that time.

It will be appreciated by those skilled in the art that, since mobile station 24 requires no transmitter, the system just described is a non-saturating system, and any number of mobile stations carried on separate launches or the like can use a single range-range system in which the third station 16 is carried on a mother vessel or the like to determine the position of the mobile stations 24. It is a non-saturating system which is not subject to the limitation on the number of users such as is present in conventional range-range systems. Further, it does not require a third station located further inland on the shore, such as would be required by a conventional hyperbolic iso-phase line-of-position navigation system. The mobile station 24 can also operate right up to the shoreline 14 with high positional accuracy, and without being subject to performance degradation such as occurs in conventional range-range systems when the vessel moves close to the shoreline.

Position transmitter 30 and third receiver 32 can take any desired form for transmitting the positional information of third station 16 to the mobile station 24. In fact, in instances where it is feasible to do so, this information need not even be broadcast, but can be transmitted over cables and wires connecting the third station 16 and the mobile station 24. Alternatively, the position transmitter 30 can be a conventional transmitter which transmits the position of third station 16 in digital format and the third receiver 32 can be a corresponding receiver to receive and demodulate this information and to apply it to the position computer 34. Such an arrangement provides an operating system which is independent of the distance between the mobile station 24 and any one of the three stations first base station 10, second base station 12 and third station 16.

However, in the presently preferred embodiment of the invention, it has been found that a very simple, effective and inexpensive means for transmitting the desired positional information is to merely relay the first and second modulation signals recovered in the receiver 20 from the first base station 10 and the second base station 12 respectively to the mobile station 24. In this embodiment, the position transmitter 30 merely becomes a simple modulator which modulates these first and second modulation signals, or frequency multiples of these signals, onto the signal of frequency $F_m$ being transmitted by the CW transmitter 18.

Now in this preferred embodiment, the third receiver 32 is again a conventional iso-phase line-of-position receiver like the receiver 20 in third station 16 and the second receiver 26. This third receiver 32 now receives the first modulation signal as relayed by the position transmitter 30 and also receives the first modulation signal directly from the first base station 10. The phases of these two modulation signals, both having the frequency $\Delta f_1$, are then subtracted.

Computation of this phase difference shows that it is equal to $$(F_m/c)(2D_1) + (\Delta f_1/c)(d_1 - d_3 - D_1)$$

where $D_1$ is the distance between the third station 16 and the first base station 10, $d_1$ is the distance between the mobile station 24 and the first base station 10, $d_3$ is the distance between the mobile station 24 and the third station 16 and $c$ is the propagation constant, or phase shift per unit distance per hertz. This equation shows that the phase meter showing the difference in the phases between the two signals of frequency $\Delta f_1$ reproduces the range $D_1$ between the third station 16 and the first base station 10, provided the correction $(\Delta f_1/c)(d_1 - d_3 - D_1)$ is made. This correction is quite small. since as was noted above, the value of $F_m$ is approximately ten thousand times greater than the value $\Delta f_1$, and could be neglected for most applications. Further, if the launch carrying the mobile station 24 is operated near the motor vessel carrying the third station 16, the valve of the $d_1$ approaches the value of $D_1$ and the value of $d_3$ approaches zero, and the correction factor itself approaches zero.

Similarly, the third receiver 32 also receives the second modulating signal of frequency $\Delta f_2$ directly from the second base station 12 and also relayed from the third station 16. Again, the phases of these two signals are subtracted and the resultant phase difference is a measure of the range between the second base station 12 and the third station 16, again assuming the above described correction is made.

The positional information of the third receiver 32 is then fed into the position computer 34 to obtain the absolute position of the mobile station 24 at that instant.

It is sometimes not important or necessary that an operator on the launch carrying the mobile station 24 know precisely where he is at any given instant. Instead, it is only necessary that the position of the mobile station 24 at a given time can be subsequently calculated. For example, if the mobile station 24 is being carried on a launch working in association with a hydrographic or geophysical survey vessel carrying the third station 16, and is making measurements or taking samples in connection with hydrographics or geophysical studies and surveys, it is sufficient if the time of the samples and measurements is recorded and the position of the mobile station 24 at this time can subsequently be calculated.

Figure 3:
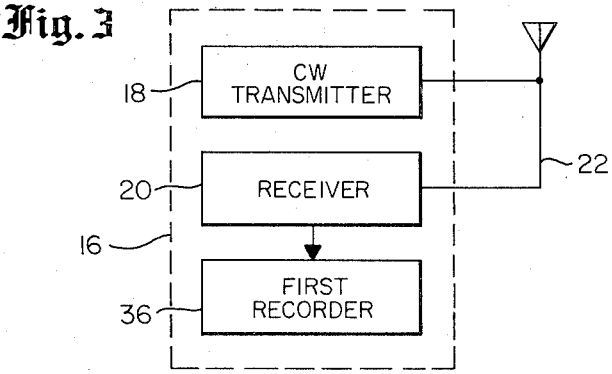
FIG. 3 is a block diagram of a iso-phase line-of-position navigation system in accordance with a second embodiment of the present invention.
Figure 3:
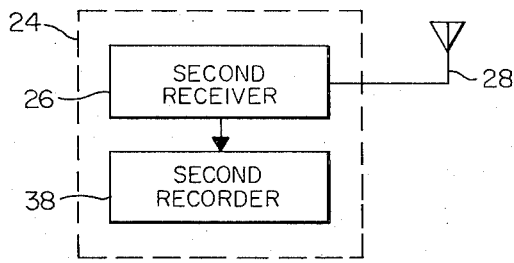
Figure 3:
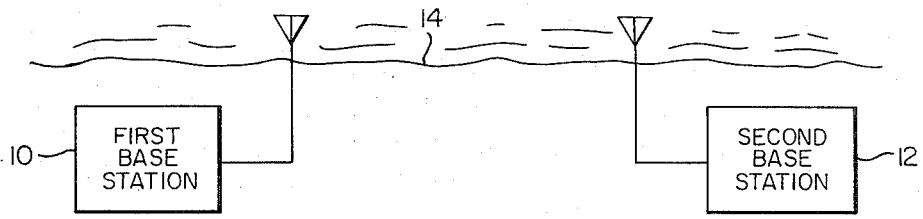
Figure 4:
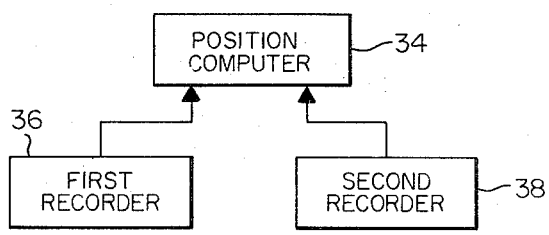
FIG. 4 is a block diagram showing the manner in which the system of FIG. 3 determines the absolute position of the mobile station.

FIGS. 3 and 4 show a block diagram of a modification of the system of FIG. 2 which meets the requirements just described but which can be operated in a simple and more economical manner than the system of FIG. 2. In the system shown in FIG. 3, the output of the receiver 20, and thus the instantaneous position of the third station 16, is recorded as a function of time on a first recorder 36 which is carried by the third station 16. Similarly, the output of the second receiver 26, which is the position of the mobile station 24 relative to the first and second base stations 10 and 12 and the third station 16 is recorded as a function of time on a second recorder 38. Subsequently, as is shown in FIG. 4, the outputs of the first and second recorders 36 and 38 respectively are played synchronously into the position computer 34 which determines the position of the mobile station 24 at the time the second recorder 38 is recording the output signals from second receiver 26.

The advantage of the system just described is that only a single position computer 34 is required rather than a separate computer for each of the mobile stations 24. The position computer 34 can now be carried on the mother vessel carrying the third station 16. The positional computation can probably even be done on computers which the vessel is carrying anyhow, so that it is not necessary to provide separate position computers at all. Further, the system requires only a single receiver on each mobile station, rather than two separate receivers as does the system of FIG. 2. Thus, economy in hardware can be effected in those applications where such a system can be used.

While the invention is thus disclosed and several specific embodiments described in detail, it is not intended that the invention be limited to these shown embodiments. Instead, many modifications will occur to those skilled in the art which lie within the spirit and scope of the invention. It is intended that the invention be limited in scope only by the appended claims.

What is claimed is:

1. An iso-phase line-of-position navigation system for determining the position of a mobile station, comprising:
    first and second base stations at respective fixed locations each including a transmitter for broadcasting signals at respective predetermined frequencies,
    a third station positioned at a movable location which includes a transmitter for broadcasting signals at a predetermined frequency, a first receiver for receiving said signals broadcast by said base stations and means responsive to said first receiver for determining the position of said third station relative to said base stations,
    a mobile station whose position is to be determined, said mobile station comprising a second receiver for receiving said signals broadcast by said base stations and said third station and means responsive to said second receiver for determining the position of said mobile station along a first iso-phase line-of-position relative to said first base station and said third station and along a second iso-phase line-of-position relative to said second base station and said third station, and
    computing means responsive to said first and second receivers for computing the position of said mobile station.

2. The navigation system of claim 1 in which said third station is positioned on a vessel and in which said first and second base stations and said third station comprises a range-range iso-phase line-of-position navigation system for determining the position of said vessel relative to said first and second base stations.

3. The navigation system of claim 2 in which said third station further comprises position transmitting means for broadcasting signals indicative of the position of said vessel, said mobile station further comprises a third receiver for receiving said signals indicative of the position of said vessel and in which said computing means is positioned on said mobile station and receives inputs from said second and third receivers to compute the position of said mobile station.

4. The navigation system of claim 3 in which said range-range navigation system includes means for modulating the signals broadcast by each of said base stations with a respective modulation signal whose phase is a function of the range from said base station to said third station, said position transmitting means in said third station comprising means for transmitting said modulation signals as received at said third station and said third receiver comprises means for receiving said modulation signals from said base stations and from said third station and for comparing the phase of each of said modulation signals as received from said third station with the phase of the corresponding modulation signal as received from its respective base station, thereby indicating at said mobile station the range from said respective base station to said third station.

5. The navigation system of claim 1 which further comprises first recording means responsive to said first receiver for recording the position of said third station as a function of time, second recording means responsive to said second receiver for recording the position of said mobile station relative to said base stations and said third station as a function of time, and means for synchronously applying output signals from said first and second recording means to said computing means to provide the position of said mobile station as a function of time.

6. The navigation system of claim 4 in which said means responsive to said second receiver determines the position of said mobile station relative to said base stations and said third station along hyperbolic iso-phase lines-of-position.

7. The navigation system of claim 4 in which said means responsive to said second receiver determines the position of said mobile station relative to said base stations and said third station along a halops iso-phase line-of-position.

* * * * *